(12) United States Patent
Reeves

(10) Patent No.: US 7,690,714 B2
(45) Date of Patent: Apr. 6, 2010

(54) LIGHTNING PROTECTED GOLF CART

(76) Inventor: Michael John Reeves, Flat 5 Sans Souci, 48 Leigh Park Road, Leigh-on-Sea, Essex SS9 2DU (GB)

( * ) Notice: Subject to any disclaimer, the term of this patent is extended or adjusted under 35 U.S.C. 154(b) by 511 days.

(21) Appl. No.: 11/503,796

(22) Filed: Aug. 14, 2006

(65) Prior Publication Data
US 2007/0075562 A1    Apr. 5, 2007

(30) Foreign Application Priority Data

Aug. 18, 2005   (GB)   ................................. 0516367.0
Aug. 2, 2006    (GB)   ................................. 0615374.6

(51) Int. Cl.
*B62D 25/06*       (2006.01)
(52) U.S. Cl. ........................................ 296/102
(58) Field of Classification Search ................. 296/102, 296/211
See application file for complete search history.

(56) References Cited

U.S. PATENT DOCUMENTS

| | | |
|---|---|---|
| 3,894,608 A | 7/1975 | Haenle |
| 6,703,556 B2 * | 3/2004 | Darveniza ..................... 174/3 |
| 2002/0162671 A1 | 11/2002 | Darveniza |
| 2003/0033755 A1 * | 2/2003 | Lord ................................. 52/3 |

FOREIGN PATENT DOCUMENTS

| | | |
|---|---|---|
| GB | 2 309 384 A | 7/1997 |
| JP | 11-348823 A | 12/1999 |
| JP | 2002-172189 | 6/2002 |

* cited by examiner

*Primary Examiner*—H Gutman
(74) *Attorney, Agent, or Firm*—Gottlieb, Rackman & Reisman

(57) ABSTRACT

A golf cart altered such that the occupants are protected against the effect of lightning strikes comprises an electrically conductive grid (23 & 23a) on the roof, preferably star shaped, connected electrically to electrically conductive down-conductors, preferably at least 6 in number, four of which may be the roof supports (16 & 24) and the other two (18) moveable to allow ease of access to the golf cart and each to be connected to a plurality of flexible electrically conductive members (26) so as to touch the ground, preferably via a metal chassis. The movable electrically conductive members are connected to at least one of the roof or the base construction by a bearing. The invention defines a protective electrically conductive cage enclosing the golf cart and surrounding its occupants with improved rigidity, safety and practicality.

20 Claims, 3 Drawing Sheets

LIGHTNING PROTECTED GOLF CART

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION (1) Field of the Invention

This invention relates to a golf cart, alternatively known as a golf buggy.

(2) Description of Related Art

Patent Number GB 2 309 384 described inter alia a golf cart stored on the roof of which, in a folded or coiled form, were a plurality of articulated lengths of electrically conductive material. In the event of lightning risk, it was envisaged to lower each of such articulated lengths to contact the ground, the lengths of electrically conductive material being so spaced apart as jointly to constitute a protective cage through the components of which any lightning strike could travel to earth without harming the occupants of the cart.

Japanese patent application 11-348823 discloses a golf cart protected against lightning strike, in which the roof is made of an electrically conductive material and is supported at four corners by electrically conductive frames. Additional electrical conductors can be mounted at the side by hooking them on to a roofpole and to the underside of the frame.

The present invention is a development and improvement of known golf carts, and has arisen as a consequence of experimental work on full-scale prototypes of the original invention loaded with life-sized dummies and subjected to elongate ultrahigh voltage sparks in simulation of a lightning strike.

This work has also indicated that preferably the spacing of the cage components should not vary unduly during use. Since in my prior proposal the components let down from the roof are flexible or articulated, and since it is a desideratum that the cart should be able to move to a place of safety even when so protected, there is a risk that the spacing of the components hanging around a moving cart might vary as their lower ends drag along making the necessary electrical contact with the ground. The arrangement of JP 11-348823 goes some way to meeting this requirement but further improvement is required to ensure adequate protection.

Our experimental work has also indicated that the spacing of the vertical components of an effective protective cage can be sufficiently large that a total of only six such components would be adequate to protect electrically that internal volume enclosed within the typical dimensions of a conventional two-person golf cart, provided that such components provide a sufficiently reliable earth path.

BRIEF SUMMARY OF THE INVENTION

The present invention sets out to provide an improved golf cart in which a sufficiently electrically protected surrounding cage comprising a conveniently small number of components, generally uniformly spaced apart, can be expeditiously formed when risk of lightning strike is perceived, with such components maintaining their relative protective positions when in such use even when the cart is in movement.

It has been found that a sufficiently reliable earth path can be provided if movable electrically conductive members are provided which are connected to at least one part of the golf cart by a bearing.

In one aspect the invention provides a golf cart, comprising:
 a base construction of electrically conductive material;
 ground wheels supporting the base construction;
 drive means supported by the base construction;
 a body extending over the base construction;
 a seat supported over the body to extend transversely of the cart for access from either side of the cart;
 a roof extending over the cart, at least part of an upper surface of the said roof being electrically conductive;
 two electrically conductive forward roof supports located one to each side of the vehicle, each in effective electrical contact with the said electrically conductive roof upper surface and also in effective electrical contact with the base construction;
 two electrically conductive rearward roof supports located one to each side of the vehicle, each in effective electrical contact with the said electrically conductive roof upper surface and also in effective electrical contact with the base construction;
 means effectively electrically connected to the base construction to ensure that the said base construction remains in effective electrical contact with the ground;
 two electrically conductive members located one to each side of the cart and each movable between (a) a first position allowing unobstructed access to the seat at either side thereof and (b) a second position in which each such member extends downwards from a generally mid point of the side edge of the roof structure, each such member being in effective electrical contact with both the electrically conductive roof upper surface and the said base construction, at least when the said members are in their respective second positions, at least one of said electrically conductive members being connected to at least one of said roof or said base construction by an electrically conductive bearing;
 whereby, when the said members are in their second positions, the roof, the roof supports, the movable members, and the base construction in effective electrical contact with the ground jointly define a protective cage against the effects of lightning strike.

According to the invention, at least one of the movable members is connected to at least one of the roof or the base construction by an electrically conductive bearing. The bearing is preferably one comprising a first bearing component and a second joint component which may move with respect to one another when moving from said first position to said second position, but remain in contact with one another when moving from said first position to said second position. It may comprise a sliding, oscillating or rotating bearing.

The bearing does not require the first and second bearing components to be dismounted with respect to one another during movement from said first position to said second position. This has many advantages.

In the first place, the connection between the first and second bearing component can be relatively rigid, making for a strong, reliable earth connection.

Further, the first and second bearing component contact surfaces are relatively easy to keep clean, to prevent loss of earth contact by ingress of dirt.

The bearing may comprise a first and second bearing component which slide with respect to one another or pivot with respect to one another.

Preferably, at least bearing is formed at at least one end of each of said movable electrically conductive members.

Preferably each of said electrically conductive members is connected to both of said roof and said base construction by bearings.

Preferably, the first and second joint components are configured so that they are movable with respect to one another in a direction from said first position to said second position or from said second position to said first position, but in no other direction. This provides a rigid and reliable joint which forms a reliable electrical connection.

Preferably, the at least one of the electrically conductive movable members, in said second position, forms an electrical contact with at least one of said roof and said base construction, the electrical contact having an electrical contact area of at least 2.5 cm$^2$ preferably at least 5 cm$^2$. This ensures a good, reliable contact for effective earthing.

Preferably, The bearing is protected to prevent ingress of dirt. At least one contact surface may be covered by a removable cover member lying adjacent to the contact surface. It may be covered by a permanent cover surface which is spaced apart from said contact surface and configured to allow said movable electrically conductive member to move between said first and second position.

In the present invention, the at least one movable member may contact the roof or base construction directly or through an electrically conductive member which is attached to the roof or base construction.

It is possible within the scope of the invention to provide a bearing which is electrically conductive by providing a first bearing component and a second bearing component which are movable with respect to one another, at least one of the first bearing component and second bearing component being formed of a non-conductive material, the electrical path between the movable member and the roof structure or base construction being provided by a flexible electrical conductor which is in permanent electrical contact with the movable member and the roof or base construction as appropriate. The permanent electrical contact may be formed by soldering, brazing, bolting etc.

Most preferably, each movable member comprises an elongate stem with an upper end portion and a lower end portion each said end portion extending in the same direction generally at right angles to the stem portion and the two said end portions lying generally in the same plane; the free end of the upper end portion being pivotable about a generally vertical upper pivot to the roof structure and the free end of the lower end portion being pivotable about a generally vertical lower pivot to the cart body, generally vertically beneath the upper pivot; whereby each member can be pivoted to its first position or its second position.

Conveniently, one or more clasps can be provided to hold each movable member in whichever position is desired. Preferably, a clasp which can be overridden by a simple releasing tug, or relocating push, will be used.

Alternatively, each movable member can be of an L-shape and possess suitable pivots at its free ends to permit forward or rearward location of the stem of the "L" by pivoting.

Alternatively again, each movable member could be a generally elongate bar pivotable at one end to the roof structure above the forward edge of the seat, whereby it is capable of being pulled down from a horizontal upper storage position to engage in a suitable clasp generally vertically below its pivot. Conversely, each movable member could be such a bar pivotable at a lower end below the forward edge of the seat for horizontal storage and capable of being pulled up to a clasp generally vertically above its pivot.

The movement need not be a pivoting movement; each movable member could be a generally vertical bar slideable at each end in parallel guides fixed to the roof and to the cart body respectively.

Preferably the base construction is provided with a plurality of short flexible electrically conductive members each in effective electrical connection with the said base construction at their respective upper end and each touching the ground at their respective lower ends. However, it appears that under conditions of heavy rain and consequent spray, or when travelling over rough ground or areas of long grass, some electrical charge will arc to the ground or even be conducted away via the wet wheels.

The rearward roof supports are preferably so shaped that they bow outwardly and rearwardly in relation to the internal space of the cart. This is not the case with conventional carts, where such supports, not being envisaged as part of an electrically conductive cage, extend downwards quite closely to the heads of the occupants.

It is a valuable and preferred feature of the invention if the movable members are also shaped so that in their second position they extend outwardly in relation to the internal space of the cart. They can be bowed, or have a stepped configuration with a relatively displaced intermediate portion.

In an optional feature of the invention, at least some of the downwardly extending effectively electrically conductive members, whether the roof support members or the movable members, can be provided with a surface layer of electrically insulating material so that the any tendency for an electrical discharge to arc to a passenger within the cart is reduced. It has however been found preferable to insulate only part of such a member, in such a way as to leave an outer face thereof, away from the cart occupant, as an electrically conductive superficial region to facilitate conduction of the high voltage discharge.

In a further optional feature the cart is provided with electrically insulating side panels, made for example of a flexible transparent synthetic polymer, located, at least when the movable members are in their second positions, at the inner side of the movable members.

It is intended that such panels should provide an electrically insulating function to help protect the occupant from any arc from the electrically conductive members.

The panels could be permanently in place on the cart, but it is more preferable if the panels are placed in their operative locations by the occupants as and when desired. Most preferably, the act of moving the movable members from their respective first to second positions will also position the respective panels.

BRIEF DESCRIPTION OF THE SEVERAL VIEWS OF THE DRAWINGS

The invention will be further described with reference to the accompanying drawings, in which.

DETAILED DESCRIPTION OF THE INVENTION

Figure 1:
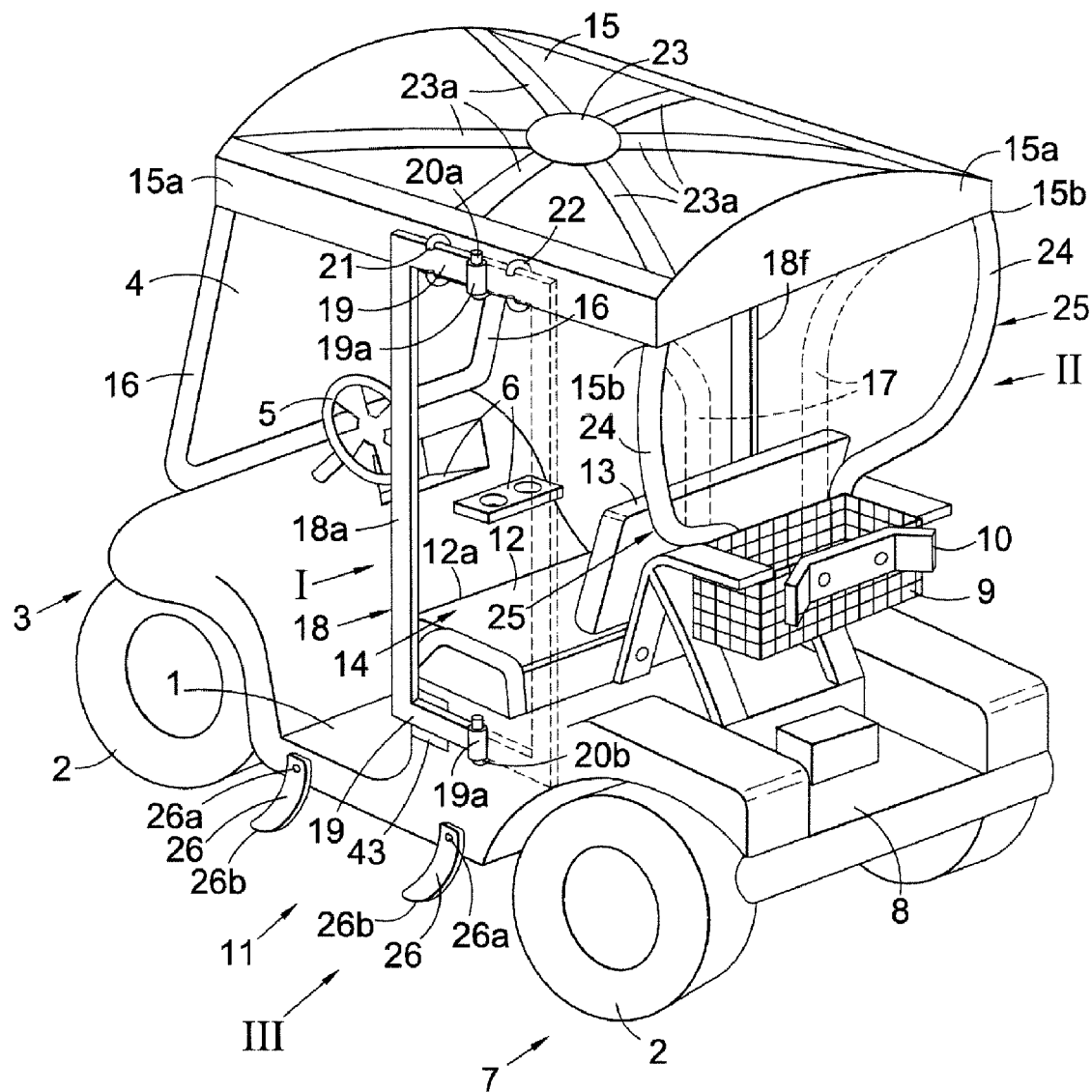
FIG. 1 shows in general view a golf cart or buggy modified to provide a measure of protection for one or two occupants against lightning strikes.

A typical golf cart, as shown in FIG. 1, has a body shell 1 and four land wheels 2. Within the shell is a metal chassis or like base construction that carries a motor and drive batteries. These internal features are conventional and not separately shown.

At its forward end 3 the cart carries a transparent windshield 4 made of glass or synthetic polymer, and a steering wheel 5, together with such racks or trays 6 as may be needed.

At its rearward end 7 the cart is shaped with well 8 to receive golf-clubs and the like for transport, and possesses a wire basket 9 for the smaller articles necessary to the game. The basket itself can carry a frame 10 to which articles in well 8 can be secured for transport.

At an intermediate position 11 the cart is provided with a transverse seat 12 for two people, with a small back rest 13. The seat is conventionally open and unencumbered to each edge of the vehicle, (e.g. at 14) so that users can readily slide on or off the seat, from either side of the cart, for the numerous occasions the cart is used during the course of a game.

A roof 15 with downwardly extending surrounding edge 15a is supported over the cart by two forward supports 16 forming part of a surrounding frame for the windshield 4, and by two rearward supports 17, shown in dotted lines, which extend inward from the rear corners 15b of the roof and then down behind the heads of the persons using the cart.

Features such as those described above are conventional over a wide range of golf carts.

In accordance with the present invention, and in continuation of the teachings of GB Patent Number 2 309 384, some aspects of such conventional carts have now been modified. The most significant of these aspects are shown at I, II and III in FIG. 1.

These modifications have been made as the result of extensive testing of a full-size prototype of a golf cart as described in GB Patent Number 2 309 384, containing one or two full-size dummies seated in the cart. These were subjected to ultra-high voltage free air discharge of lengthy electrical sparks simulating a lightning strike. The results were confirmatory of the teachings of GB Patent Number 2 309 384, but provided important extra information.

Firstly, we have realized that for a conventional golf cart, wide enough to seat two people side by side and appropriately longer than it is wide, six spaced-apart electrically conductive generally vertical components are a sufficient number to constitute a cage protective against lightning strike. More than six could of course still be used.

Secondly, we have perceived that totally flexible vertical components may not be optimum. While they are usually effective there is a chance that they might move relative to each other (whether mechanically as the cart is moving, or under electromagnetic effects as it is struck by lightning) and possibly as a consequence affect the performance of the protective cage.

Thirdly, we have identified an area of conventional cart design which has led to results where a dummy figure in the cart might not be adequately protected and might become part of the spark path.

In the description of modifications to a golf cart which follows reference is made to "effective electrical connection" of electrically conductive components.

When structures intended to conduct electricity are assembled, care is taken to ensure close conductor-to-conductor contact within the assembly.

That is the preferred practice in the present invention. In the special and extreme conduction conditions of a lightning strike an effective electrical connection between components can still exist even if those components are somewhat spaced apart: the high-voltage discharge will arc across any minor gap, without significantly decreasing the effectiveness of the assembly for its intended purpose. Accordingly, if, after a long period of use at least one electrical connection (for example between an end of the movable conductor which does not form the bearing) has a lower level of contact or a hairline crack, the present invention will still function. However it is a particular advantage of the present invention that the bearing between the movable member and the roof or base construction ensures such close conductor-to-conductor contact which can be maintained over a long period of use.

Thus, in this description and in the appended claims the term "effective electrical connection" is intended to include such an eventuality where such a small gap, or imperfect conductor-to-conductor connection, not affecting the practical operation of the assembly, is present, whether that gap, or imperfection of contact, arises or is intentionally created either on assembly or during use.

In the region of FIG. 1 shown generally at I there is an electrically conductive elongate metal member 18 with a long stem portion 18a and two shorter end portions 19 extending at right-angles thereto, one at each end.

These portions 19 both extend in the same direction, and occupy the same general plane as the stem portion 18a. Each end portion 19 is generally about half as long as the seat 12 is deep, and each is pivoted at its free end 19a at generally vertically-extending upper and lower pivots 20a and 20b respectively. Thus, the whole assembly can pivot from a generally forward position as shown in full lines to a generally rearward position shown in dotted lines.

The upper and lower pivots 20a and 20b each provide a bearing in accordance with the invention.

At the forward position shown in full lines the assembly is held by a clasp 21 adequate to prevent the assembly swinging arbitrarily but readily disengageable by manual pressure exerted by a user. At this position the stem portion 18a extends vertically downwards at the outer edge 12a of the front seat 12, and will have its upper end in effective electrical contact with the surrounding edge 15a of the roof of the cart.

At the rearward position shown in dotted lines the assembly can be held by a similar effective but readily disengageable clasp 22. At this position the stem portion 18a presents no hindrance to a person entering or leaving the cart.

The clasps 21, 22 are shown as engaging the upper of the end portions 19; such clasps could equally well engage at the lower such end portion, or to both end portions, as long as easy engagement or disengagement is permitted.

The roof 15 of the cart and its surrounding edges 15a could be made of electrically conductive material, or could be totally covered with such material. Experiment has shown however that it is adequate to provide a partial covering of the roof in electrical contact with the surrounding edges 15a at least at the sides of the cart.

As shown in FIG. 1 by way of example there is provided a central area 23 of electrically conductive material and six flat strips 23a of such material extending one to each corner of the roof 15 to be in effective electrical contact with a continuous and electrically conductive surrounding edge 15a which extends all round the roof.

While it is envisaged that the electrical contact between the movable member 18 and the roof shall take place at the area of edge 15a where they meet at the time when the member is in its forward position, it could also be arranged that the pivot 20a, or the clasp 21, or both, are in effective electrical contact with this surrounding edge 15a.

All of the description of the stem portion 18a, end portions 19 and their various interconnections with each other and the roof should also be taken as applying to a like assembly at the far side of the cart. Stem portion 18f of this assembly is visible in the drawing. The rest is not shown but its structure can readily be inferred from the depiction of its visible counterpart, described above.

It is also intended that the forward roof supports 16, surrounding windshield 4, should be electrically conductive, i.e. formed of or covered with electrically conductive material, and should be in effective electrical connection at their upper ends with the roof 15 and its surrounding edges 15a.

At region II of FIG. 1 a modification is made to the usual golf cart structure to assist in achieving the objectives of the invention. Currently, the rearward roof supports 17, made of any suitably strong material, extend downwards as shown in dotted lines. That is to say, each such support is usually formed to extend inward from its corner 15b and then to run vertically downward to the underlying supportive chassis. Thus they run just behind the heads of the two occupants.

It is now proposed to form alternative rearward roof supports 24 which are necessarily electrically conductive and have their upper ends in effective electrical connection with the roof 15 and its surrounding edges at 15b. It is also proposed to shape these supports 24 to bow outwardly and rearwardly in their respective downward paths, as shown in FIG. 1 at 25. This provides a much greater space between the heads of the users and such rearward supports.

Golf carts typically possess a chassis, conventionally made of metal for strength. It is not shown in the drawings, but occupies the space within the shell 1 enclosing a cart motor and batteries.

In the embodiment of the invention shown in FIG. 1, the lower ends of the forward roof supports 16; the lower ends of the modified roof supports 24; and the lower ends of the movable members 18 when these members are in their forward positions; are all to be arranged to be in effective electrical connection with this metal chassis.

Region III of FIG. 1 shows a modification of the invention beyond the proposal in GB Patent Number 2 309 384. In that Patent it was proposed to provide elongate members for deploying from the roof of the cart to the ground to form a cage structure protective against lightning strikes. Work with full-size prototypes has shown that this is effective, but I have realised that a simpler structure can be made. In this the risk of distortion of the cage (which is constituted of flexible elongate members which are capable of relative displacement as the cart is moving, or possibly as a result of electromagnetic effects as the lightning strike discharges) is obviated.

Short spaced-apart electrically conductive flexible members such as shown at 26 are now proposed. They are fastened in effective electrical connection with the chassis at their upper end 26a and normally they trail along the ground at their lower ends 26b for safety purposes; that is to say, they are not specially deployed at the threat of lightning. Of course, they could be stored and separately deployed but that is not as safe and the number and placement of such members 26 around the chassis can be varied and the provision of two such at each side of the cart is not critical.

The golf cart of the invention is used as follows.

Normally the assembly 18, 19 is in its rearward position as shown in dotted lines, so that the users of the cart may from time to time during their progress around the golf course easily get in or out of the cart at each side.

In the observed or advised risk of lightning each passenger can reach back and swiftly pull the assembly 18, 19 forward around its pivots 20a, 20b, so that the upper and lower ends of the stem 18a come into effective electrical connection with the edge 15a and with conductive region 43, connected to the chassis, respectively. The readily engageable and disengageable pressure clasps are no more difficult to operate than a car seat belt.

There is thus formed an electrically conductive cage, with an adequate number of surrounding components suitably spaced from each other and from the bodies of the users and thus protective against lightning strike, and with the charge conducted to earth via the chassis and flexible members 26.

This cage is dimensionally stable against mechanical displacement of its components, whether this is caused by movement of the vehicle or magnetic effects of the electrical discharge. Thus, the cart can be driven, while protected, to a place of greater safety or comfort.

It is to be noted that while the provision of flexible members 26 is to be preferred, conditions of actual use in a thunderstorm may also lead to discharge of the current by arc discharge directly from the base of the chassis to the ground, or via electrical connection through any moisture on the ground wheels. This is especially the case if the vehicle is travelling over rougher ground, or high grass, or is used in spray conditions of torrential rain. This does not detract from the utility of the invention.

Modifications can be made within the scope of the invention, and especially to the exact nature of the deployable side assembly as shown by way of example at 18, 19.

Figure 2:
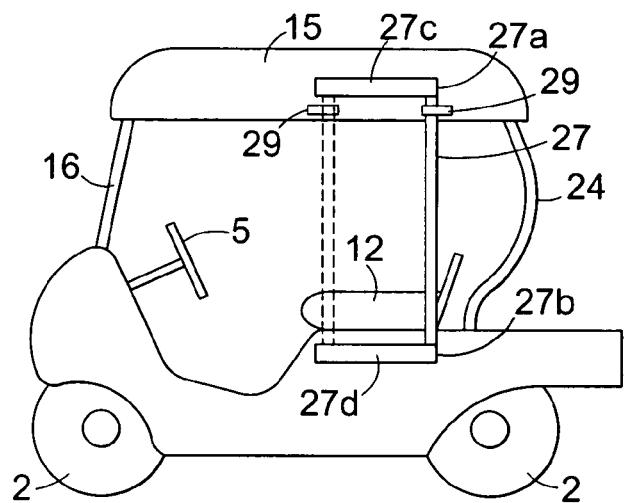
FIGS. 2 to 5 show diagrammatically alternative mountings for a component part of the modified cart shown in FIG. 1.

FIG. 2 shows diagrammatically a vertical member 27, analogous to stem portion 18a but mounted to slide at its upper and lower ends 27a, 27b, in slides 27c and 27d respectively from a rearward position allowing ready access to the cart to a forward position as a component of a protective cage. It will be appreciated that the member 27 is in effective electrical connection at its ends 27a, 27b with the edge 15a of roof 15 and with the chassis respectively. Suitable clasps at locations 29 hold member 27 securely but in a manner capable of ready disengagement in both its forward and rearward positions. The sliding contact between the ends 27a and 27b and the respective slides 27c or 27d form sliding bearings.

Figure 3:
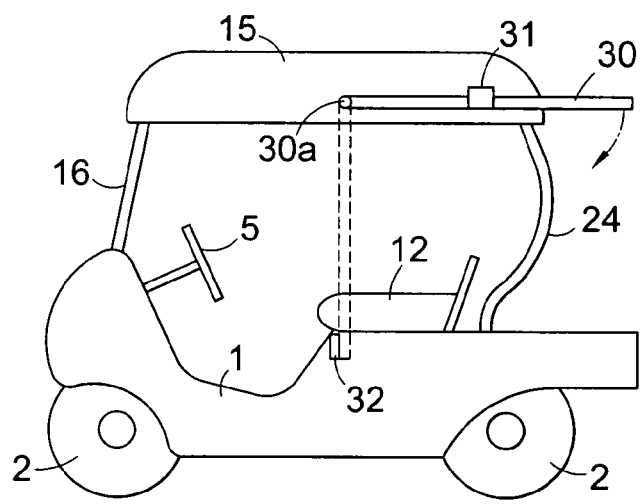

FIG. 3 shows a horizontal member 30 pivoted at the roof 15 around pivot 30a and held again in a readily disengageable clasp at 31 from which it can be pulled down to a vertical position clasped similarly clasped at 32 at the then lower end. Pivot 30a provides a bearing at the top end of the movable member 30.

Figure 4:
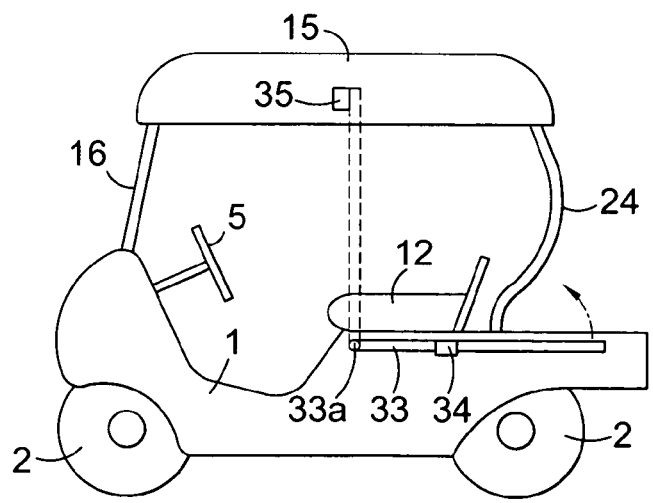

FIG. 4 shows the converse structure to FIG. 3 in which a normally horizontal member 33, clasped at 34 until needed, can be pulled up around its pivot 33a to a vertical position and clasped at 35. Pivot 33a forms a bearing at the lower end of the horizontal member 33.

Figure 5:
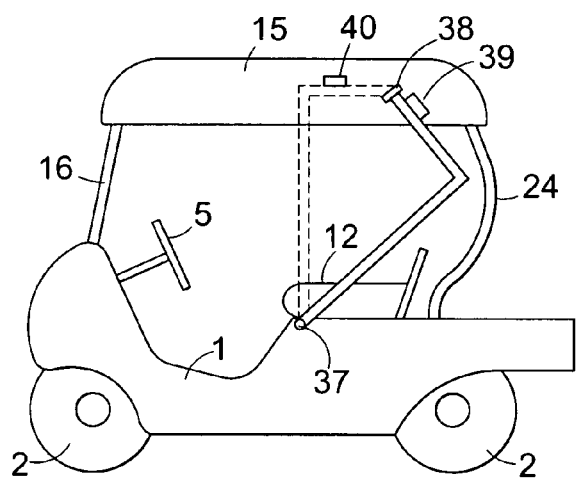

FIG. 5 shows an L-shaped member 36 pivoted at its lower end at 37 and at its upper end at 38, respectively at ends of the long limb and short limb of the L-shape. This member can be suitably clasped at 39 when not in use, and pivoted to be held by a clasp at 40 when in use. A converse arrangement, with the short limb of the L-shape at the base, can readily be envisaged from this. The pivots at 37 and 38 each provide a bearing A competent engineer will be able to envisage other detailed arrangements of the intermediate side members within the scope of the invention; in all cases the electrically conductive members should be in effective electrical connection with both the roof structure and the chassis.

Figure 6:
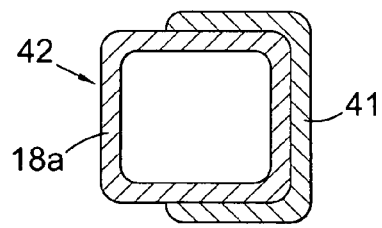
FIG. 6 shows in horizontal cross-section an electrical conductor modified in accordance with an optional feature of the invention.

FIG. 6 shows, in horizontal cross-section of a typical conductor 16, 17 or 18, an optional feature of the invention.

To increase the protection of the users from arcing of the electrical discharge in a lightning strike it is envisaged to provide an electrically insulating layer 41 at the surface of the stem portion 18a (for example) and similarly at the surfaces of the forward and rearward supports 16 and 17 respectively.

Most preferably, and as shown in the drawing, the layer 41 does not extend to cover the whole surface in each case, but is configured to cover only the inner face of each such member and to leave uncovered the outer face i.e. that face indicated at 42 as being further from the passengers, since ultra-high voltage discharges are believed to travel along the surfaces of conductors.

Figure 7:
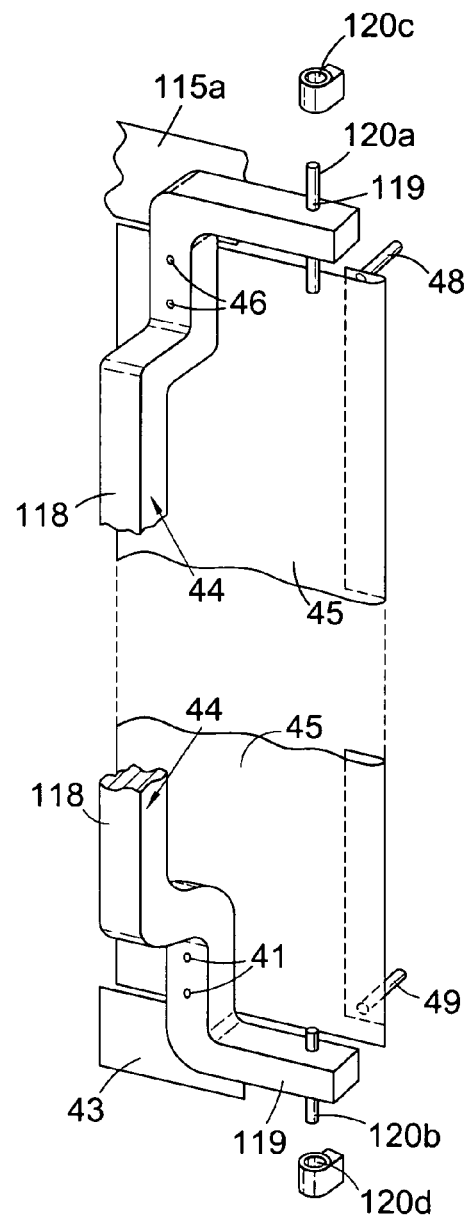
FIG. 7 shows an optional modified shape for each of two movable effectively electrically conducting members, and also shows an optional protective screen for use with members of such a shape.

FIG. 7 shows in a partial and broken-away view, and by way of example, two further valuable optional features of the invention.

This Figure shows, in its forward position, an electrically conductive movable member 118, with end portions 119 having respective upper and lower vertical pivots 120a, 120b. The numbering of these features is analogous to that in FIG. 1. Clasps for the assembly, and depiction of the rearward position of the assembly have however been omitted from this drawing for ease of illustration. When in position, the long vertical pivots 120a and 120b will be received in close fitting bores 120c and 120d. Each of the pivots 120a and 120b and the bores 120c and 120d are electrically conductive and form a bearing with close conductor-to-conductor contact for providing good earthing contact.

As shown in its forward position, the member 118 is in effective electrical contact with the roof edge 115a and the chassis at 43, both as in the embodiment of FIG. 1.

In this embodiment, however, an intermediate portion 44 of the member 118 is outwardly stepped, away from the occupants of the cart, to enhance the protection from lightning strike. This portion 44 could of course alternatively be smoothly bowed away from the occupants. It will be immediately apparent from a comparison with FIG. 1 that in the rearward position of member 118 the portion 44 extends inwardly of the cart, but behind the occupants.

Also shown in FIG. 7 is a transparent polymer screen 45. In the embodiment shown, this screen is attached to the movable member 118 at the top and bottom by attachments 46, 47 respectively, and secured at its rearward edge by attachments 48, 49 in such a way that when the movable member 118 is folded forward the screen is automatically also deployed, to enhance the protection against arcing.

The use of a permanent side screen 45, or of such a screen which is selectively deployable separately from the movable members 118 is also envisaged within the scope of the present invention.

I claim:

1. A golf cart, comprising:
    a base construction of electrically conductive material;
    ground wheels supporting the base construction;
    a body extending over the base construction;
    a seat supported over the body to extend transversely of the cart for access from either side of the cart;
    a roof extending over the cart, at least part of an upper surface of said roof being electrically conductive;
    two electrically conductive forward roof supports located one to each side of the cart, each in effective electrical contact with said electrically conductive roof upper surface and also in effective electrical contact with the base construction;
    two electrically conductive rearward roof supports located one to each side of the cart, each in effective electrical contact with said electrically conductive roof upper surface and also in effective electrical contact with the base construction;
    means effectively electrically connected to the base construction to ensure that said base construction remains in effective electrical contact with the ground, said electrical contacting means comprising a plurality of short flexible electrically conductive members each in effective electrical connection with said base construction at their respective upper ends and each touching the ground at their respective lower ends;
    two electrically conductive members located one to each side of the cart and each movable between (a) a first position allowing unobstructed access to the seat at either side thereof and (b) a second position in which each electrically conductive member extends downwards from a generally mid point of the side edge of the roof, each electrically conductive member being in effective electrical contact with both the electrically conductive roof upper surface and said base construction, at least when said members are in their respective second positions, at least one of said electrically conductive members being connected to at least one of said roof or said base construction by a bearing;
    whereby, when said members are in their second positions, the roof, the roof supports, the electrically conductive members, and the base construction in effective electrical contact with the ground jointly define a protective cage against the effects of a lightning strike.

2. A golf cart as claimed in claim 1 wherein the bearing is one comprising a first bearing component and a second bearing component which are configured to move with respect to one another when moving from said first position to said second position, but remain in contact with one another when moving from said first position to said second position.

3. A golf cart as claimed in claim 2 wherein the bearing comprises a first and a second bearing component which slide with respect to one another.

4. A golf cart as claimed in claim 2 wherein the bearing comprises a first and a second bearing component which pivot with respect to one another.

5. A golf cart as claimed in claim 2 wherein said first and second bearing components are configured so that said first and second bearing components are movable with respect to one another in a direction from said first position to said second position or from said second position to said first position, but in no other direction.

6. A golf cart as claimed in claim 1 wherein said bearing component is formed at least one end of each of said movable electrically conductive members.

7. A golf cart as claimed in claim 1 wherein each of said electrically conductive members is connected to both of said roof and said base construction by a bearing.

8. A golf cart as claimed in claim 1 wherein, the at least one electrically conductive movable member forms, in said second position, an electrical contact with at least one of said roof and said base construction, the electrical contact having an electrical contact area of at least 5 cm² preferably at least 10 cm².

9. A golf cart as claimed in claim 1 wherein, when said at least one movable, electrically conductive member is in said first position, there is a first contact surface and a second contact surface, and at least said second surface is covered by a removable cover member lying adjacent to the contact surface.

10. A golf cart as claimed in claim 1 wherein the at least one movable member contacts the roof or base construction directly or through an electrically conductive member which is attached to the roof or base construction.

11. A golf cart as claimed in claim 1 wherein said bearing comprises a first bearing component and a second bearing component which are movable with respect to one another, at least one of the first bearing component and second bearing component comprising a non-conductive material, the electrical path between the movable member and said roof structure or base construction being provided by a flexible electrical conductor which is in permanent electrical contact with the movable member and the roof or base construction as appropriate.

12. A golf cart as claimed in claim 1 wherein each movable member comprises an elongate stem with an upper end portion and a lower end portion, each said end portion extending in the same direction generally at right angles to said stem and the two said end portions lying generally in the same plane; a free end of the upper end portion being pivotable about a generally vertical upper pivot to the said roof and a free end of the lower end portion being pivotable about a generally vertical lower pivot to the cart body, generally vertically beneath the upper pivot; whereby each movable member can be pivoted to said first position or said second position.

13. A golf cart as claimed in claim 1 wherein each movable member is of an L-shape and possesses suitable pivots at its free ends to permit forward or rearward location of the stem of the "L" by pivoting.

14. A golf cart as claimed in claim 1 wherein each movable member is a generally elongate bar pivotable at one end to the roof structure above the forward edge of the seat, whereby it is capable of being pulled down from a horizontal upper storage position to engage in a suitable clasp generally vertically below its pivot.

15. A golf cart as claimed in claim 1 wherein each movable member is a generally elongate bar pivotable at one end below the forward edge of the seat, whereby it is capable of being pulled up from a horizontal lower storage position to engage in a suitable clasp generally vertically above its pivot.

16. A golf cart as claimed in claim 1 wherein each movable member is a generally vertical bar slideable at each end in parallel guides fixed to the roof and to the cart body respectively.

17. A golf cart as claimed in claim 1 wherein the rearward roof supports are so shaped that said supports extend outwardly in relation to the internal space of the cart.

18. A golf cart as claimed in claim 1 wherein said movable electrically conductive members are so shaped so that in said second position said movable electrically conductive members extend outwardly in relation to the internal space of the cart.

19. A golf cart as claimed in claim 1 wherein at least some of the downwardly extending effectively electrically conductive members are provided with a surface layer of electrically insulating material.

20. A golf cart as claimed in claim 19 wherein said surface layer of electrically insulating material leaves an outer face of the respective downwardly extending effectively electrically conductive member, as an electrically conductive superficial region.

* * * * *